(12) United States Patent
Phanse et al.

(10) Patent No.: US 7,016,406 B1
(45) Date of Patent: Mar. 21, 2006

(54) ADAPTATION STRUCTURE AND METHODS FOR ANALOG CONTINUOUS TIME EQUALIZERS

(75) Inventors: Abhijit Phanse, Sunnyvale, CA (US); Abhijit G. Shanbhag, San Jose, CA (US); Qian Yu, Cupertino, CA (US); Venugopal Balasubramonian, San Jose, CA (US); Jishnu Bhattacharjee, San Jose, CA (US); Prashant Choudhary, San Jose, CA (US); Debanjan Mukherjee, San Jose, CA (US); Fabian Giroud, San Jose, CA (US); Edem Ibragimov, San Jose, CA (US)

(73) Assignee: Scintera Networks, San Jose, CA (US)

( * ) Notice: Subject to any disclaimer, the term of this patent is extended or adjusted under 35 U.S.C. 154(b) by 0 days.

(21) Appl. No.: 10/426,588

(22) Filed: Apr. 29, 2003

(51) Int. Cl.
*H03H 7/40* (2006.01)

(52) U.S. Cl. .................................................. 375/232
(58) Field of Classification Search ................ 375/229, 375/230, 232, 233, 234, 240.02, 237; 708/320, 708/321, 322, 323
See application file for complete search history.

(56) References Cited

U.S. PATENT DOCUMENTS

| | | | | |
|---|---|---|---|---|
| 3,815,014 A | * | 6/1974 | Davis et al. | 323/267 |
| 5,557,644 A | * | 9/1996 | Kuwabara | 375/340 |
| 5,602,507 A | * | 2/1997 | Suzuki | 329/304 |
| 5,650,954 A | * | 7/1997 | Minuhin | 708/819 |
| 6,088,390 A | * | 7/2000 | Russell et al. | 375/233 |
| 6,721,279 B1 | * | 4/2004 | Zhang et al. | 370/252 |

* cited by examiner

*Primary Examiner*—Emmanuel Bayard
(74) *Attorney, Agent, or Firm*—MacPherson Kwok Chen & Heid LLP; Tom Chen (57) ABSTRACT

Tap coefficients for fractionally-spaced equalizers are updated iteratively using error statistics from an input bit stream and an output bit stream, such as from a forward error correction circuit. The process continues until the errors converge to a sufficiently small number. Knowledge of the error patterns are used apriori to adaptively change the tap coefficients in a feedforward filter.

29 Claims, 8 Drawing Sheets

ADAPTATION STRUCTURE AND METHODS FOR ANALOG CONTINUOUS TIME EQUALIZERS

BACKGROUND

1. Field of the Invention

This invention relates to communication systems and in particular to equalization of input signals representing information transmitted over transmission lines or from storage systems.

2. Related Art

Many digital data communications systems employ adaptive equalization to compensate for the distortion effects of changing channel conditions and disturbances on the signal transmission channel. The equalization process estimates the transfer function of the transmission channel and applies the inverse of the transfer function to the received signal so as to reduce or eliminate the distortion effects. Channel equalization typically employs filters that remove amplitude and phase distortions resulting from a frequency dependent time variant response of the transmission channel, for example, to thereby provide improved symbol decision capability. Equalization removes baseband intersymbol interference (ISI) caused by transmission channel disturbances including the low pass filtering effect of the transmission channel. ISI causes the value of a given symbol to be distorted by the values of preceding and following symbols, and essentially represents symbol "ghosts" since ISI includes advanced and delayed symbols with respect to a reference symbol location in a given decision region.

An adaptive equalizer is essentially a digital filter with an adaptive response to compensate for channel distortions. Several well-known algorithms are available for adapting the filter coefficients and thereby the filter response to converge the equalizer.

Significant effort has been spent enhancing adaptation algorithms for use in data transmission whether over communication systems or from storage mediums. Such adaptation algorithms are required to compensate for distortions introduced into the signals by the transmission medium through which the signals have traveled. Such transmission mediums might comprise, for example, optical networks, wireless networks, standard public switch telephone networks or even storage media where the signals have been stored and transmitted through interfaces to a user. In all of these situations, the media through which the signal is transmitted or in which the media is stored may, in fact, affect the contents of the signal. Accordingly, equalization networks are generally employed to place the signal as nearly as possible in its original form. Since however, the exact nature of this distortion as to which the signal is subjected at the receiving end may not be known at the receiving end, the structure and methods employed to equalize the received signals necessarily involve certain assumptions. Typically, the techniques for enhancing the adaptation algorithms focus on the value of the signal at the time the signal is sampled (known as the convergence time). Very limited effort has been spent with respect to continuous time adaptation for continuous time delay line equalizers. Similarly, little effort has been spent using forward error correction ("FEC") statistics for carrying out adaptation of equalizer.

One technique which has been used to adapt the feedforward equalizer to compensate for signal distortion due to the transmission or storage media is known as discrete time least mean square based adaptation. Typically, the discrete time least mean square ("LMS") based adaptation is applied to the feedforward equalizer followed by decision feedback. This technique, which has been widely explored as a starting point for various enhancements for discrete time adaptation can be expressed as:

$$c_i[k+1]=c_i[k]+\mu*s_i[k]*e[k]$$

where:
  k=denotes discrete time points;
  $\mu$=is an adaptation parameter;
  $c_i$=denotes the $i^{th}$ tap either feed forward or feedback;
  $s_i[.]$=denotes the sampled input signal appropriately time aligned as applied to the $i^{th}$ tap; and
  e[.]=denotes the sampled slicer error signal, computed as the difference between the slicer input and slicer output signal appropriately time aligned.

The continuous-time analog of the above adaptation is:

$$c_i(t) = \int_0^t \mu \cdot e(\tau) \cdot s_i(\tau) \cdot d\tau$$

One problem with this form of the adaptation is "coefficient drift" with fractionally spaced equalizers.

Forward error correction statistics have also been used for adaptation of equalizers to recover as much of the original signal as possible and to reduce the bit error rate ("BER"). A simple approach counts the total number of errors of the type 0 mapped to 1 and the total number of errors of the type 1 mapped to 0 and uses this to adapt a symbol-spaced linear equalizer with three taps. The symbol which is referred to is the width of a pulse representing either a 1 or a 0. This technique achieves some improvement in the BER. However, additional improvement is desirable.

SUMMARY

According to one aspect of the present invention, a continuous-time least mean square (LMS) based approach is used to adaptively change the tap coefficients for use by a fractionally-spaced linear equalizer with decision feedback. A feedforward filter, receiving the input signal, generates an output signal. Adaptation of the coefficients are continuously updated by adaptive coefficient generators, based on the current coefficients and the amount or frequency of error of the signal using the current tap coefficients or other metrics representing the amount of signal errors (e.g., uncompensated inter-symbol interference (ISI)) detected by the system. As will become further evident, the presently claimed invention benefits the host system or network by effectively increasing the signal-to-noise ratio (SNR), in an adaptive manner, thereby reducing the bit error rate (BER) and, in turn, adding robustness (e.g., with respect to intersymbol interference, phase offsets or jitter among the data symbols) in a convenient plug-and-play manner. For example, in the case of a fiber optic network, such added performance and robustness will allow a longer network to be realized without a concomitant increase in network infrastructure.

In accordance with one aspect of the invention, an enhanced adaptation method using forward error correction ("FEC") statistics is described which uses the bit patterns around a bit in error and which may be obtained from a forward error correction system. The information so obtained is used to adapt a fractionally spaced linear equalizer with decision feedback.

Typically, the use of a sufficiently strong FEC circuit reduces the bit error rate (BER) of a digitized signal input to the FEC circuit, resulting in an output signal having a substantially smaller BER. Thus, based on the input and output signals at the FEC, the bit pattern around the bit that was in error at the input of the FEC (and corrected by the FEC) is obtainable from an "intelligent" FEC. Information from the FEC is used to adapt the tap coefficients to reduce errors in the input bit stream. This results in a higher signal-to-noise ratio or lower BER. The corrected output bit stream is compared with the uncorrected input bit stream to the FEC, from which apriori changes to the tap coefficients are derived. This iterative process continues until the desired system performance is obtained.

In addition, the structure and algorithms of this invention provide more robust continuous-time realization for least mean square adaptations.

This invention provides a more robust data interface which is capable of providing a lower BER for signals with lower signal to noise ratios and which is also capable of providing a fixed BER for a signal drive from a larger network than previously possible. Accordingly, this invention improves the signal to noise ratio threshold, provides a more robust system and is capable of use with a larger system than heretofore possible to achieve the same BER.

This invention will be more fully understood in conjunction with the following detailed description taken together with the following drawings.

BRIEF DESCRIPTION OF THE DRAWINGS

Use of the same or similar reference numbers in different figures indicates same or like elements.

DETAILED DESCRIPTION OF THE PREFERRED EMBODIMENTS

Figure 1:
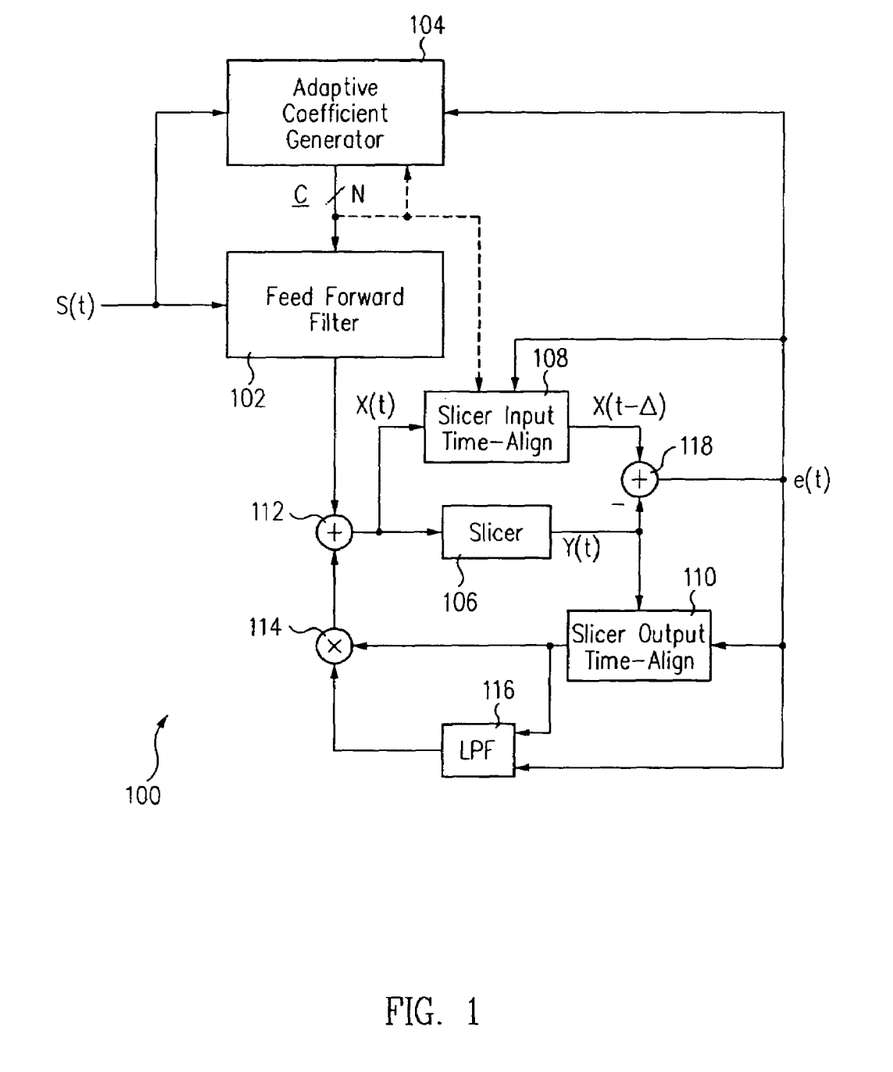
FIG. 1 shows a structure for implementing an adaptation network in accordance with one aspect of the invention for a continuous-time LMS based system.

FIG. 1 shows one embodiment of the present invention for a continuous-time least mean square (LMS) based adaptive equalizer 100. LMS-based equalizer 100 includes a feedforward filter 102, an adaptive coefficient generator 104, an output signal slicer 106, a slicer input time-align circuit 108, and slicer output time-align circuit 110. Feedforward filter 102 receives an input data signal s(t) and tap coefficients from adaptive coefficient generator 104 and generates an equalized signal, which is input to an adder 112. The other input to adder 112 is the product 114 of the output of an integrator, such as a low pass filter block 116, and slicer output time-align circuit 110. The feedback signal into adder 112 provides an iterative correction to an error signal e(t) for use by adaptive coefficient generator 104 to generate adaptive tap coefficients. The error signal, processing through adder 118, is the difference between the outputs of slice input time-align circuit 108 and slicer 106, x(t–$\Delta$) and y(t), respectively. As time passes, the error signal converges until a sufficiently small error signal is obtained through adaptively changing the tap coefficients.

Figure 2:
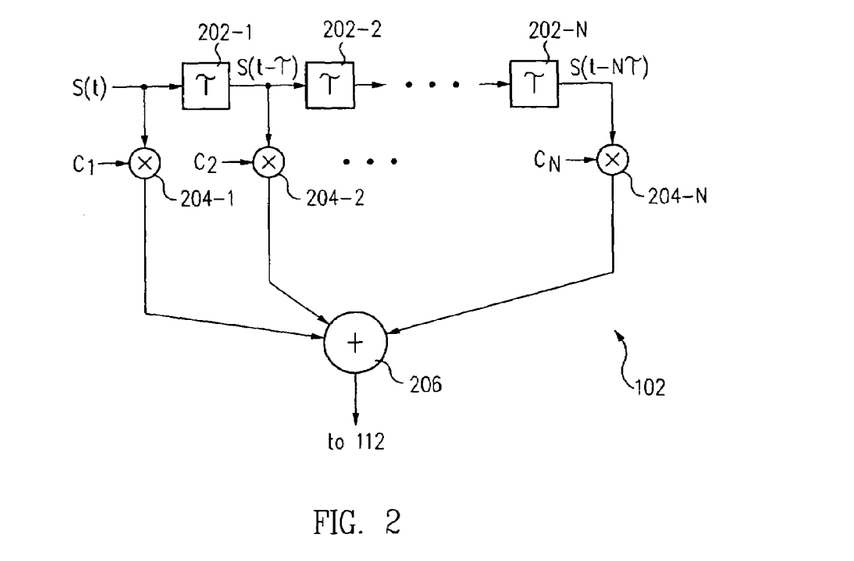
FIG. 2 shows one embodiment of a feedforward filter suitable for use in the system of FIG. 1.

FIG. 2 shows one embodiment of a feedforward filter suitable for use as feedforward filter 102 of FIG. 1. The feedforward filter includes a series of signal delay elements 202-1 to 202-N. Each delay element 202 delays the incoming signal by a fixed amount $\tau$, e.g., s(t–$\tau$) s(t–2$\tau$), . . . s(t–N$\tau$). The delay $\tau$ is typically selected to be less than a symbol period, and in one embodiment, about half a symbol period to achieve good performance at low SNR. The input data signal s(t) and each successive delayed signal from delay elements 202-1 to 202-N are multiplied by multipliers 204-1 to 204-N with its respective adaptive coefficient signals from adaptive coefficient generator 104. The product signals are then summed by an adder circuit 206 to form the equalized signal.

Figure 3:
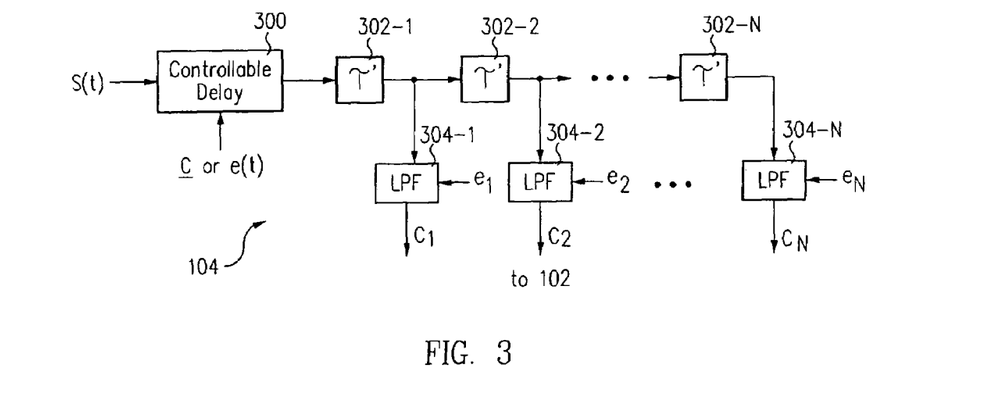
FIG. 3 shows one embodiment of an adaptive coefficient generator for use in the system of FIG. 1.

FIG. 3 shows one embodiment of an adaptive coefficient generator for use as adaptive coefficient generator 104 of FIG. 1. The generator includes a controllable delay 300, which receives input data signal s(t) and either vector c (tap coefficient vector) which is the feedback from the output of low pass filter blocks 304 or the error signal e(t), and introduces a fixed delay into the signal. One type of controllable delay suitable for the present invention is an error timing control (ETC) and precursor/postcursor control (PPC) circuit, such as described in commonly-owned U.S. patent application Ser. No. 10/290,993, filed Nov. 8, 2002, entitled "Adaptive Signal Equalizer with Adaptive Error Timing and Precursor/Postcursor Configuration Control", which is incorporated herein by reference in its entirety. The controllable delay in the present invention is used to align the error signal e(t) with the input signal s(t). In one embodiment, the ETC/PPC circuit of the above referenced application is used to adaptively set the delay by using the tap coefficients $c_1$ to $c_N$ of vector c or error signal e(t) as a control input signal. Note that FIG. 1 shows two possible inputs to adaptive coefficient generator 104, either tap coefficient c (shown as a dotted line) or error signal e(t) (shown as a solid line), along with input signal s(t). In one embodiment, the ETC/PPC circuit of the above referenced application is used to adaptively set the delay by using the tap coefficients $c_1$ to $c_N$ of vector c or error signal e(t) as a control input signal. Note that FIG. 1 shows two possible inputs to adaptive coefficient generator 104, either tap coefficient c (shown as a dotted line) or error signal e(t) (shown as a solid line), along with input signal s(t).

Figure 3A:
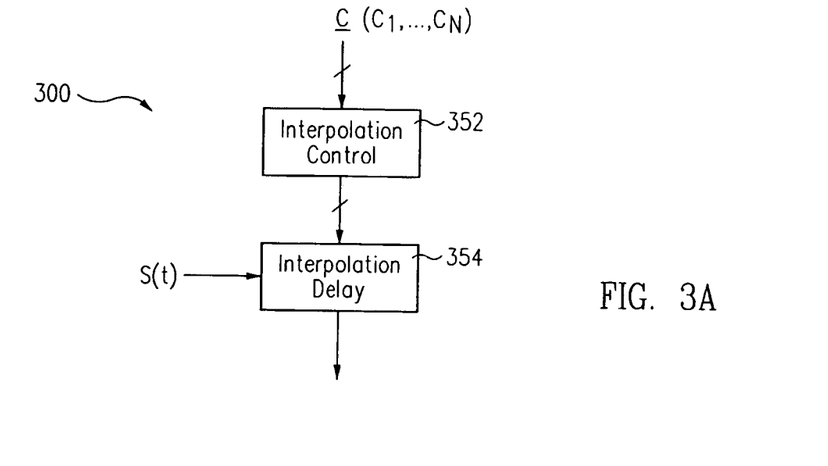
FIG. 3A shows one embodiment of a controllable delay in FIG. 3.

FIG. 3A shows one embodiment of controllable delay 300. Controllable delay 300 includes an interpolation control stage 352 and an interpolation delay stage 354. Interpolation control 352 processes the feedback tap coefficients $c_1$ to $c_N$ to produce a set of delay interpolation control signals for interpolation stage 354. In response to these delay interpolation control signals, interpolation delay stage 354 processes its input signal s(t) to produce the corresponding delayed signal for processing by delay elements 302.

Figure 3B:
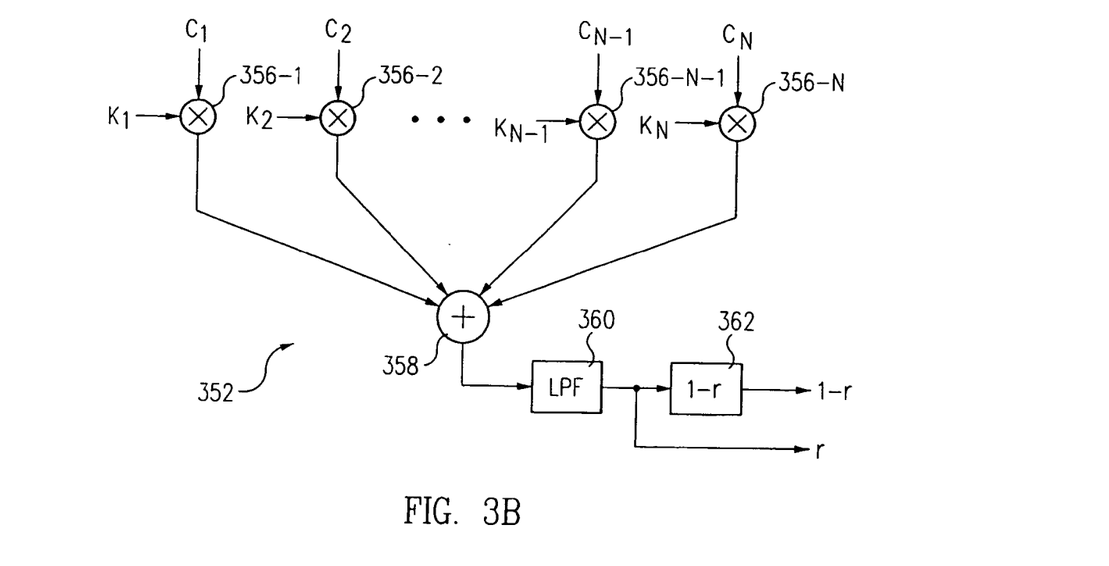
FIG. 3B shows one embodiment of an interpolation control circuit of FIG. 3A.

FIG. 3B shows one embodiment of interpolation controller 352. Interpolation controller 352 includes a set of signal multipliers 356-1 to 356-N, a signal combining circuit 358, a signal integration circuit (e.g., a low pass filter) 360, and a signal complement circuit 362, interconnected substantially as shown. Each of the feedback adaptive coefficient signals $c_1$ to $c_N$ is multiplied in a respective multiplier 356-1 to 356-N with a corresponding weighted or scaled signal $K_1$ to $K_N$. In one embodiment, $K_1$ to $K_{N/2}$ is equal to +1, while $K_{(N/2)+1}$ to $K_N$ is equal to −1. The resulting product signals are summed in signal combiner 358. The sum signal is integrated by signal integrator 360 to produce the primary delay interpolation control signal representing the timing control ratio parameter r. This delay interpolation control signal is also complemented by signal complement circuit 362 to provide the complement delay interpolation control signal. Signal complement circuit 362 processes the delay interpolation control signal by subtracting it from a normalized value (e.g., unity) to produce the complement signal. The uncomplemented and complemented signals are then processed by interpolation delay 354.

Figure 3C:
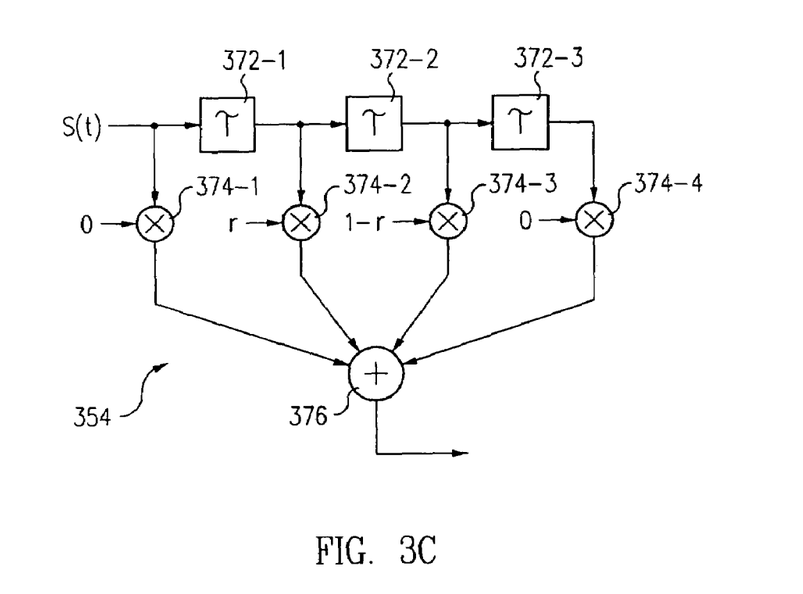
FIG. 3C shows one embodiment of an interpolation delay circuit of FIG. 3A.

FIG. 3C shows one embodiment of interpolation delay 354. Interpolation delay 354 includes three signal delay elements 372-1, 372-2, and 372-3. The incoming signal, i.e., the input signal s(t), and the corresponding successively time-delayed versions are multiplied in signal multipliers 374-1, 374-2, 374-3, and 374-4 with corresponding interpolation control signals. The resulting product signals are summed in a signal combiner 376 to produce the delayed version of the incoming signal.

Figure 4:
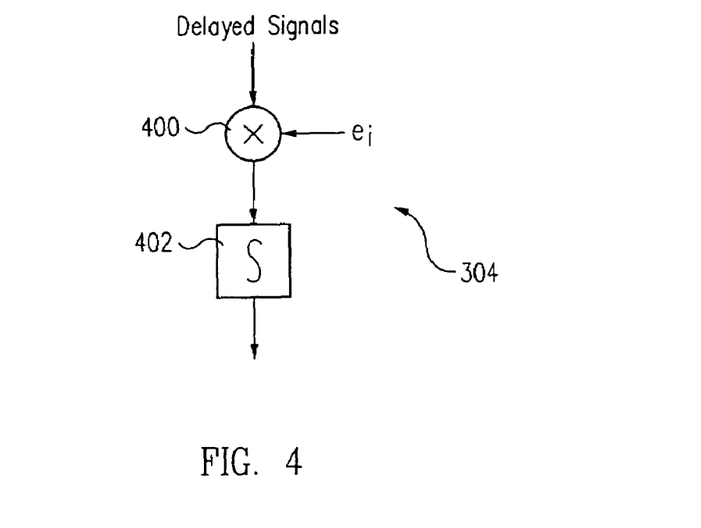
FIG. 4 shows one embodiment of a low pass filter block suitable for use in the system of FIG. 3.

Referring to FIG. 3, the aligned output signal of controllable delay 300 is processed through a series of delay elements 302-1 through 302-N. Delay elements 302 introduce a delay of τ' to its input signal. In one embodiment, τ' is greater than the delay τ of delay elements 202 of FIG. 2, although it may also be suitable for τ' to be approximately equal to τ in other embodiments. Having τ'>τ results in a generally more robust system. The delayed signals (by multiples of τ') are input to respective low pass filter blocks 304-1 to 304-N, along with the error signal e(t) from adder 118 of FIG. 1. Low pass filter blocks 304 multiply each delayed signal with a corresponding error signal and integrate the result to generate individual tap coefficient signals for use by multipliers 204-1 to 204-N of FIG. 2. FIG. 4 shows one embodiment of low pass filter block 304, which includes a multiplier circuit 400 and an integrator circuit, such as a low pass filter 402.

In one embodiment, low pass filters 402 are analog (or continuous-time) first-order low-pass filters having a transfer function $$H(s) = \frac{G}{1 + s \cdot T_l}$$

where G is the gain of the low pass filter and $T_l$ is the leakage time constant. The filter parameters gain G and time constant $T_l$ can be chosen to meet system and component requirements. For example, the time constant $T_l$ is selected as a non-zero positive number for more robust performance with a fractionally-spaced feedforward filter at the front-end. The gain G should be large enough so that the mismatch of the tap coefficient with the least-mean square value at convergence is sufficiently small. Further, $T_l$>0 and G need to be moderate enough to minimize the effects of "tap coefficient drift". Another factor in selecting gain G and time constant $T_l$ is to achieve a convergence time that is sufficiently small for the system. Selecting values for G and $T_l$ depend on system requirements and include factors such as the maximum steady state mismatch of signals, time variability of the channel, amount of noise within the channel, and parasitic effects of the circuit. In one embodiment, the gain G may be set to 10 to 50 which will result in small mismatch and possibly stable operation. The time constant $T_l$ is typically set to about 10,000 to 100,000 symbol times, in one embodiment. For very fast varying channels, $T_l$ is much smaller. $T_l$ is larger for channels having less temporal variations and more noise. Higher order low pass filters are also suitable for use with the present invention. Referring back to FIG. 1, similarly, low pass filter block 116 receives error signal e(t) from adder 118 and the output of slicer output time-align circuit 110. These two signals are then multiplied and integrated, such as through a low pass filter.

Figure 5:
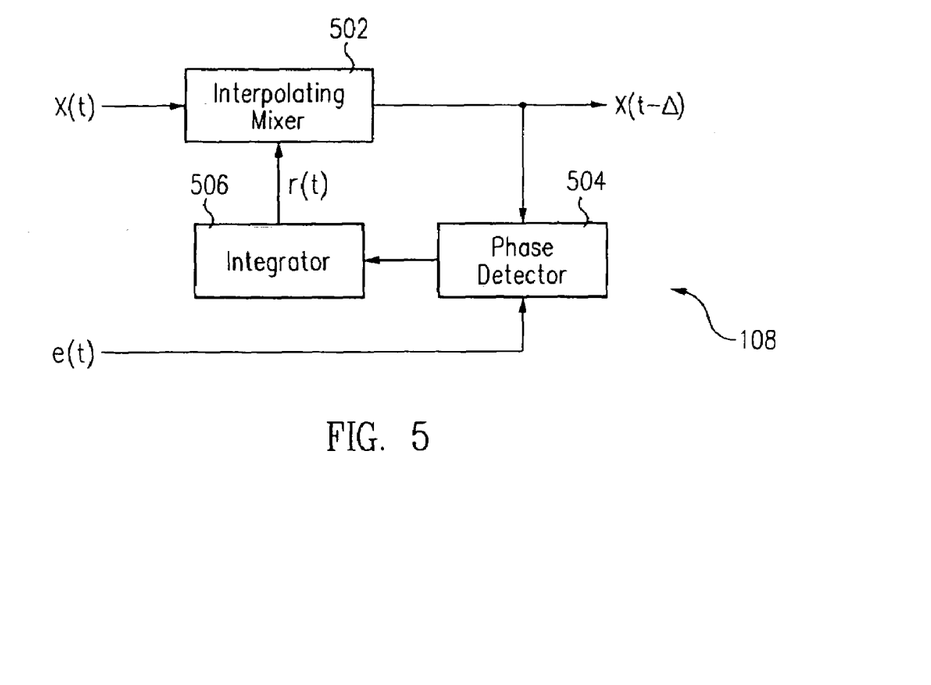
FIG. 5 shows one embodiment of a slicer input time align circuit for use in the system of FIG. 1.

FIG. 5 shows one embodiment of a slicer input time-align circuit for use as slicer input time-align circuit 108 of FIG. 1. The circuit includes a controllable delay, which receives the data signal x(t) from adder 112 of FIG. 1 and introduces a delay Δ into the signal. One type of controllable delay suitable for the present invention is an adaptive least mean square-based timing interpolation (ALTI) circuit, such as described in commonly-owned U.S. patent application Ser. No. 10/321,893, filed Dec. 17, 2002, entitled "Adaptive Signal Latency Control for Communications Systems Signals", which is incorporated by reference in its entirety. The controllable delay in the present invention is used to time align the slicer input signal with the slicer output. In one embodiment, the ALTI circuit of the above referenced application is used to adaptively set the delay to align the signals by using the tap coefficients $c_1$ to $c_N$ of vector c or error signal e(t) as a control input signal. Note that FIG. 1 shows two possible inputs to slicer input time-align circuit 108, either tap coefficient c (shown as a dotted line) or error signal e(t) (shown as a solid line), along with signal x(t) from adder 112. The ALTI block may be used to time-align the slicer input to compute the "slicer error" signal which is the difference between the slicer output and the slicer input signals, i.e., the time-align circuit 108 delays its output signal x(t−Δ) to compensate for delays introduced by processing of the input signal by the circuit.

FIG. 5 shows one embodiment of slicer input time-align circuit 108, which includes an interpolating mixer 502, a phase detector 504, and a signal integrator 506, interconnected substantially as shown. The error signal e(t) is compared in signal phase by phase detector 504 with the delayed signal from interpolating mixer 502. The resulting detection signal is integrated by signal integrator 506 (e.g., a low pass filter) to produce an interpolation control signal r(t) for interpolating mixer 502.

Figure 5A:
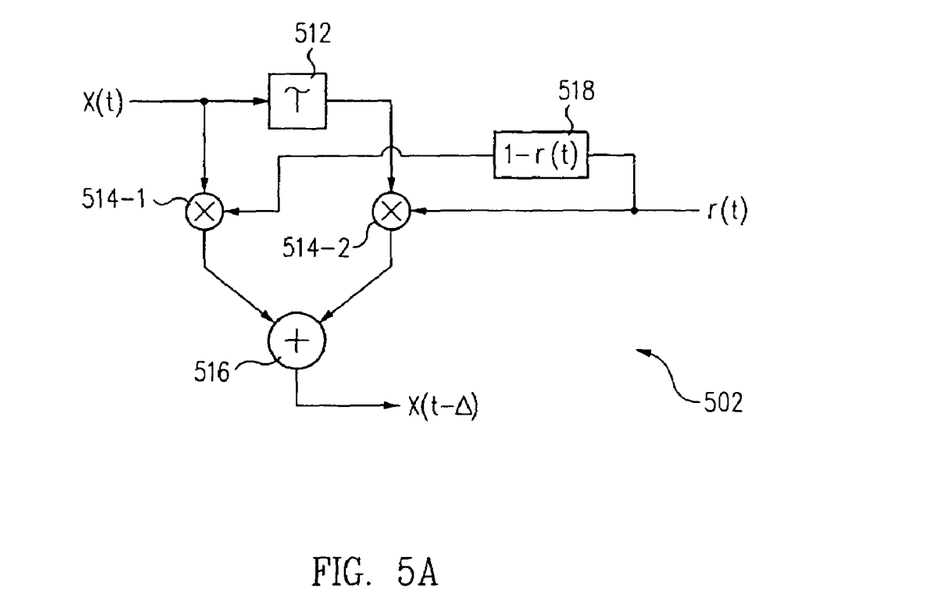
FIG. 5A shows one embodiment of an interpolating mixer circuit of FIG. 5.

FIG. 5A shows one embodiment of interpolating mixer 502, which is implemented as a tapped delay line with correlated tap coefficients. The input signal x(t) is delayed by a signal delay element 512 which is a fractional delay element introducing a delay which is less than one data symbol period in duration. The resulting fractionally delayed signal and the original input signal x(t) are mixed (e.g., multiplied) in respective signal mixers 514-1, 514-2 with respective interpolation control signals representing timing interpolation parameters. The first timing interpolation parameter signal is the feedback signal from signal integrator 506 (FIG. 5). This signal is also complemented by a signal complement circuit 518 in which the input signal is subtracted from a normalized value (e.g., unity) to produce the second timing interpolation parameter signal. The resultant mixed signals are combined (e.g., summed) in a signal combining circuit 516 to produce the delayed signal x(t−Δ).

Figure 5B:
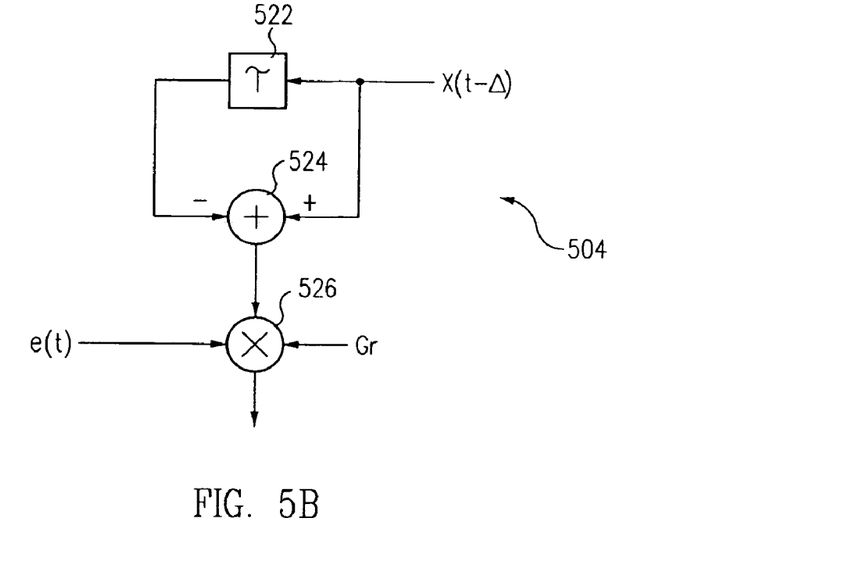
FIG. 5B shows one embodiment of a phase detector circuit of FIG. 5.

FIG. 5B shows one embodiment of phase detector 504 of FIG. 5, which can be implemented using a fractional delay element 522, a signal combining circuit 524, and a signal mixer 526, interconnected substantially as shown. The delayed signal x(t−Δ) is further delayed by fractional delay element 522, after which it is combined with delayed signal x(t−Δ) in signal combiner 524 such that the further delayed signal is subtracted from the input delayed signal x(t−Δ). The resulting combined signal is mixed (e.g., multiplied) in signal mixer 526 with the error signal e(t) (and a gain constant $G_p$, if desired) to produce the phase detection signal for signal integrator 506 (FIG. 5A).

Figure 6:
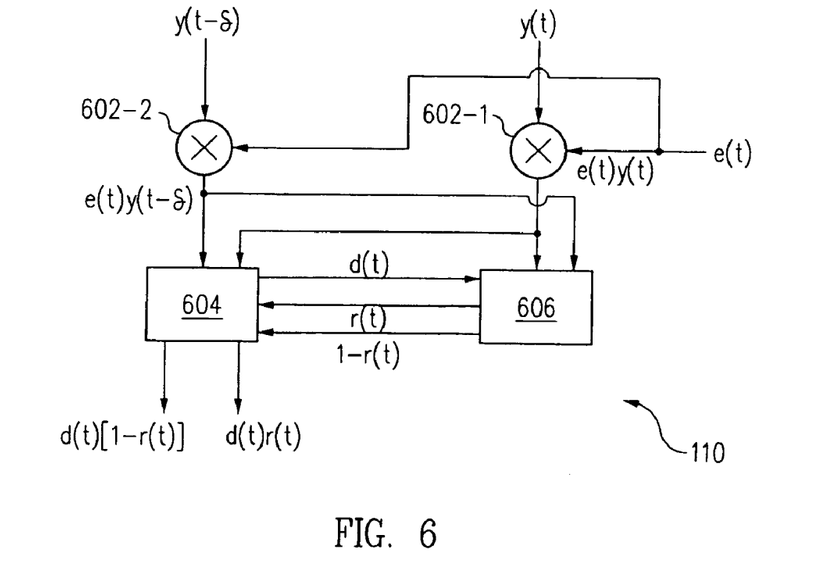
FIG. 6 shows one embodiment of a slicer output time align circuit for use in the system of FIG. 1.

FIG. 6 shows one embodiment of a slicer output time-align circuit for use as slicer output time-align circuit 110 of FIG. 1. The circuit includes a controllable delay, which receives the data signal y(t) from slicer 106 of FIG. 1 and introduces a delay into the signal. One type of circuit suitable for the present invention is a fat tap adaptation (FTA) circuit, such as described in commonly-owned U.S. patent application Ser. No. 10/322,024, filed Dec. 17, 2002, entitled "Adaptive Coefficient Signal Generator for Adaptive Signal Equalizers with Fractionally-Spaced Feedback", which is incorporated herein by reference in its entirety. The controllable delay in the present invention is used to time align the decision feedback signal, which is the signal from slicer 106, to be a symbol period delay with respect to the slicer input signal from which it is cancelled. A method of obtaining this delay in an adaptive manner is by using the FTA block, as described in the above-referenced application, which uses the tap coefficients or error signal e(t) as a control input signal.

FIG. 6 shows one embodiment of slicer output time-align circuit 110, which includes multiplier circuits 602-1, 602-2 and control signal generator circuitry implemented as a coefficient signal generator 604 and a timing interpolation parameter signal generator 606, all interconnected as substantially shown. The adjacent time-delayed feedback signals, the output signal y(t) of slicer 106 (FIG. 1) and the signal y(t−δ) delayed by a symbol period δ, are multiplied in their respective multiplier circuits 602-1, 602-2 with the error signal e(t). The resulting product signals e(t)y(t) and e(t)y(t−δ) are processed by signal generator circuits 604, 606. Coefficient signal generator circuit 604 provides an adaptation control signal d(t) to timing interpolation parameter signal generator circuit 606, which in return, provides two other adaptation control signals r(t) and 1−r(t) back to coefficient signal generator 604. As a result of processing these input signals e(t)y(t), e(t)y(t−δ), r(t), and 1−r(t), coefficient signal generator 604 provides the adaptive coefficient signals d(t)r(t) and d(t)[1−r(t)], where signal element d(t) is the weighting factor and signal element r(t) is the factor indicative of the degree of correlation between the adjacent time-delayed feedback signals y(t) and y(t−δ).

Figure 6A:
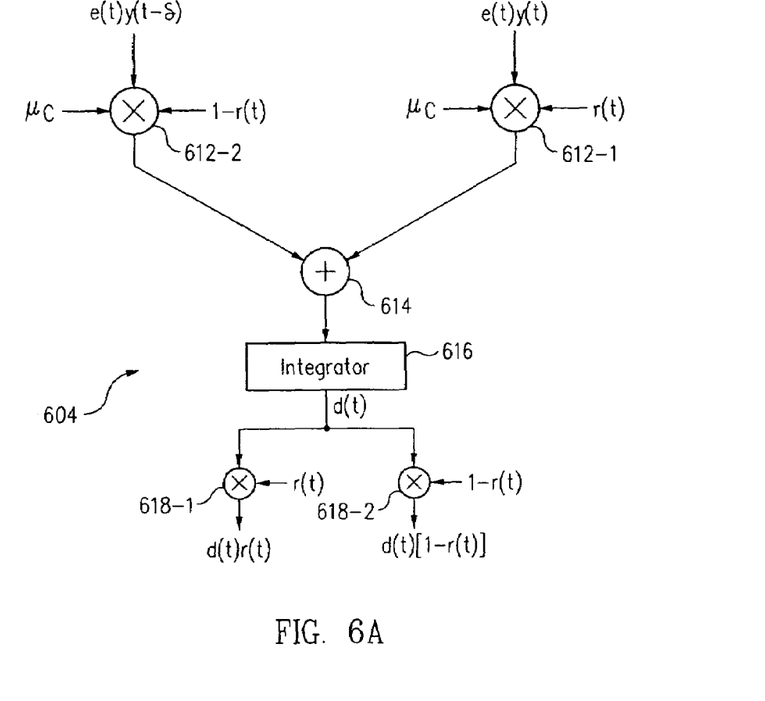
FIG. 6A shows one embodiment of a coefficient generator circuit of FIG. 6.

FIG. 6A shows one embodiment of coefficient signal generator 604. Initial product signals y(t) and y(t−δ) are further multiplied in multiplier circuits 612-1, 612-2 with the adaptation control signals r(t) and 1−r(t), respectively, from timing interpolation parameter signal generator 606. An additional constant signal $\mu_c$ can also be multiplied as part of the product operations or implemented as a constant scaling factor within the multiplier circuits 612-1, 612-2.

The resulting product signals are summed in a signal summing circuit 614. The resulting sum signal is integrated in an integration circuit 616 (e.g., a low pass filter) to produce the first adaptation control signal d(t). This adaptation control signal d(t), in addition to being provided to timing interpolation parameter signal generator 606, is multiplied within multiplier circuits 618-1, 618-2 with the other adaptation control signals r(t) and 1−r(t), respectively, provided by timing interpolation parameter signal generator 606. The product signals resulting from these multiplication operations are the adaptive coefficient signals d(t)r(t) and d(t)[1−r(t)].

Figure 6B:
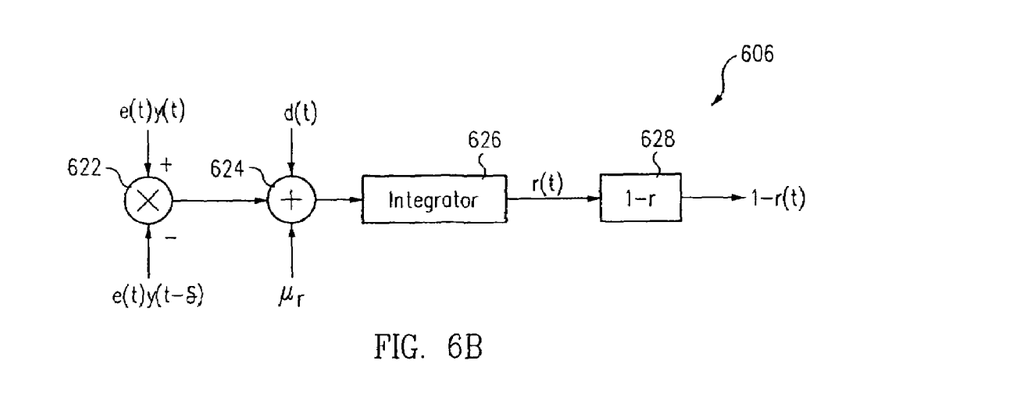
FIG. 6B shows one embodiment of a timing interpolation parameter signal generator circuit of FIG. 6.

FIG. 6B shows one embodiment of timing interpolation parameter signal generator 606. The initial product signals e(t)y(t) and e(t)y(t−δ) are differentially summed in a signal summing circuit 622, where the second product signal e(t)y(t−δ) is subtracted from the first product signal e(t)y(t). The resulting difference signal is multiplied in a multiplier circuit 624 with the adaptation control signal d(t) provided by coefficient signal generator 604. As with the multiplier circuits 612-1, 612-2 of coefficient signal generator 604, an additional constant signal $\mu_r$ can also be used in this multiplication operation or implemented as a constant scaling factor within multiplier circuit 624 operation.

The resulting product signal is integrated by a signal integration circuit 626 (e.g., a low pass filter) to produce one of the adaptation control signals r(t) used by coefficient signal generator 604. This adaptation control signal r(t) is further processed by a signal complement circuit 628, in which the input signal r(t) is subtracted from a reference signal having a normalized value, with the resulting difference signal 1−r(t) serving as the other adaptation control signal used by coefficient signal generator 604. For example, if the value of the incoming signal r(t) were considered to have a normalized signal value range bounded by the values of zero and one, signal complement circuit 628 subtracts the incoming signal r(t) from the value of one to produce the output signal 1−r(t).

The above described embodiment utilizes a fractionally-spaced linear equalizer with decision feedback circuitry. By selecting the appropriate parameters for the low pass filters, the convergence of the least mean square value can be controlled to prevent coefficient drift of the adaptive tap coefficients. The continuous time iterative process results in the ability to adaptively change the tap coefficients for error minimization.

Figure 7:
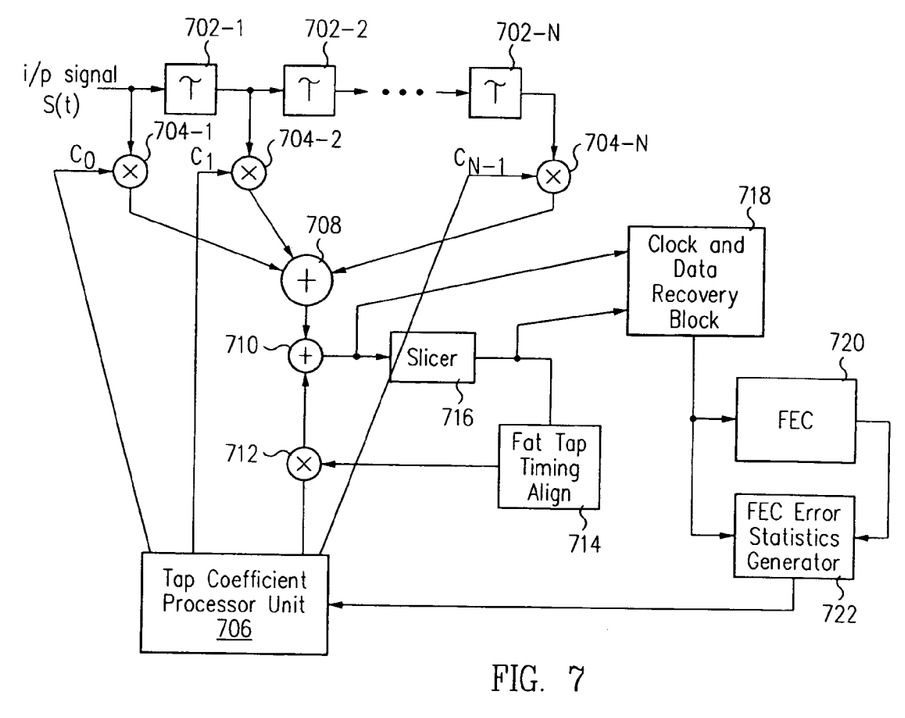
FIG. 7 shows one embodiment of an adaptation network in accordance with one aspect of the invention for a forward-error correction based system.

According to another aspect of the invention, an equalizer can be adapted using forward error correcting (FEC) information. FIG. 7 shows one embodiment of an FEC-based adaptive equalizer scheme. The circuit in FIG. 7 includes delay elements 702-1 to 702-N that delay an input signal s(t), i.e., s(t), s(t−τ), . . . s(t−Nτ). The input signal and delayed versions are multiplied by mixers or multiplier circuits 704-1 to 704-N with corresponding tap coefficients generated from a tap coefficient processor unit 706. The product signals are then summed together, such as by an adder circuit 708. These elements typically form a feedforward filter. The sum signal or output of the feedforward filter is added to the output of a multiplier circuit 712. Multiplier circuit 712 generates the product of input signals from tap coefficient processor unit 706 and a slicer output time-align circuit 714. Slicer output time-align circuit 714 time-aligns the feedback signal with a symbol period. Details of a slicer output time-align circuit can be found in commonly-owned U.S. patent application Ser. No. 10/322,024, filed Dec. 17, 2002, entitled "Adaptive Coefficient Signal Generator for Adaptive Signal Equalizers with Fractionally-Spaced Feedback", incorporated above by reference in its entirety. FIGS. 6, 6A, and 6B show one embodiment of a slicer output time-align circuit suitable for use in the circuit of FIG. 7. The output sum from adder circuit 710 is received by a slicer 716, where the sliced output is fed back to slicer output time-align circuit 714.

Both the input signal to and the output signal from slicer 716 is processed by a conventional clock and data recovery (CDR) circuit 718, which derives a clocking signal from the signal bits. The output of CDR circuit 718 is received by a forward error correction (FEC) circuit 720, such as a Reed-Solomon error detecting and correction circuit. Other conventional FEC circuits that decode or "correct" an input bit stream and generate a decoded output bit stream are also suitable for use with the present invention. The decoded output signal from FEC circuit 720 is then compared with the input signal of FEC circuit 720 to determine the bit patterns around the bit in error, such as by an FEC error statistics generator 722. Once FEC error statistics generator 722 determines the bit patterns, that signal is used by tap coefficient processor unit 706 to adaptively change the tap coefficients, which increases the signal-to-noise ratio (SNR) or reduces the bit error rate (BER). This iterative process continues until sufficient convergence is achieved.

According to one embodiment, for each possible bit pattern $b_i$ of appropriately selected size (typically 5 to 7 bits centered at the errored bit) around the errored bit (as determined by the FEC), we associate a mask vector $m_i$ (same size as tap coefficient vector c) selected a priori. Each component of $m_i$ is selected as an increment or decrement of the corresponding tap coefficient so as to reduce the likelihood of such a bit pattern being in error as input to the FEC and may also be based on the selective bit error pattern correction of the FEC. For example, if the bit error occurs at bit 0 due to the neighboring bits being 1, the mask vector may be selected so that the tap coefficients corresponding to these neighboring bits (with center tap corresponding to the bit in error) are decremented and the other tap coefficients are kept unchanged or incremented.

Every pre-selected period of time T (based on the desired adaptation rate which could be once every few hundred symbols), the number $n_i$ of occurrences of every bit pattern $b_i$ around the errored bit is obtained. The time T is smaller for faster varying channels and may range from one symbol period to a few hundred symbols. If an input bit stream to FEC circuit 720 is, for example, 01101 and the corrected bit stream out of FEC circuit 720 is 01001, the errored bit is the third bit and the bit pattern around the errored bit is 01x01. FEC error statistics generator 722, which in one embodiment may be part of the FEC chip, compiles the number that this same bit pattern occurs, as well as the number of times all other bit patterns occur. The numbers $n_i$ may be appropriately normalized to real number weights $w_i$, e.g., $w_i = k * n_i$. Weighting coefficient k is selected to balance between the speed of adaptation (low k) and the tracking error variance at steady state (high k), based on the system and performance requirements. Too high a k will have high adaptation speed, but will also have large variance around steady state. Too low a value for k will result in a speed that may be too low for adaptation. Some factors in selecting k include how quickly the channel is changing, the type of channel, and the length of the update period T. FEC error statistics generator 722 may compile the bit pattern error statistics simply by comparing (such as with an exclusive-OR function) the input to FEC circuit 720, which may have bit patterns in error, and the decoded output from FEC circuit 720, which is relatively error-free.

After every such period of time T, the tap coefficient vector c is updated as follows:

$$\underline{c} \rightarrow \underline{c} + \sum_{i=0}^{B-1} w_i \cdot \underline{m}_i$$

where B is the total number of different bit patterns around the errored bit. This is carried out within tap coefficient processor unit 706 of FIG. 7. For example, assume T is equal to 1000 symbol periods, N=5 (a five-tap coefficient vector), and B=2 (two bit error patterns). The two bit error patterns are 01110, which has occurred 20 times, and 10110, which has occurred 5 times. The bit in error is the $3^{rd}$ or middle bit. The normalization coefficient k is selected to be 0.005. Thus, the real number weights are $w_0 = 0.005 * 20 = 0.1$ $w_1 = 0.005 * 5 = 0.025$ corresponding to bit patterns 01110 and 10110, respectively. The mask vectors $m_0$ and $m_1$ are selected as follows:

$M_0^T = [0\ -1\ 0\ -1\ 0]$ $M_1^T = [0\ 0\ 0\ -1\ 1]$ where T is the transpose. Mask vector $m_0$ decrements the symbols around errored bit (with a −1 at bit positions 2 and 4), which should reduce the likelihood of bit error since less energy surrounds the associated bit position, i.e., less intersymbol interference. Similarly, mask vector m1 decrements the symbols around the errored bit. However, here, only the bit at the fourth position needs to be decremented. Note also that the last component of mask vector $m_1$ is a 1. A zero can also be used, i.e., the coefficient can be incremented or unchanged. So, after 1000 symbol periods, tap coefficient processor unit 706 updates the tap coefficient vector as $c \rightarrow c + w_0 m_0 + w_1 m_1$ or $$\begin{bmatrix} C_0 \\ C_1 \\ C_2 \\ C_3 \\ C_4 \end{bmatrix} \rightarrow \begin{bmatrix} C_0 \\ C_1 - 0.1 \\ C_2 \\ C_3 - 0.125 \\ C_4 + 0.025 \end{bmatrix}$$

After the next period T (or 1000 symbol periods in this example), the tap coefficient vector c is updated again for use by multipliers 704-1 to 704-N. This iteration process continues until the desired convergence is obtained.

Figure 8:
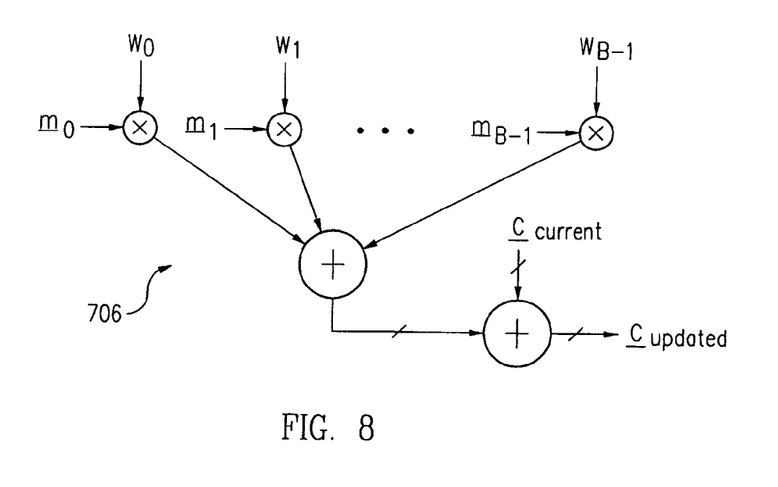
FIG. 8 shows one embodiment of a tap coefficient processor unit suitable for use in the system of FIG. 7.

FIG. 8 shows one embodiment of a tap coefficient processor unit for use as tap coefficient processor unit 706 of FIG. 7. Tap coefficient processor unit 706 receives a set of normalized weights $w_0$ to $w_{B-1}$, where B is the total number of different error patterns between the input bit stream to FEC circuit 720 and the decoded or corrected output bit stream to FEC circuit 720, as determined by FEC Error Statistics Generator 722. The weights w represent the frequency of occurrence for each error bit pattern. Tap coefficient processor unit 706 also generates a corresponding set of mask vectors $m_i$, where i is from 0 to B−1. Each mask vector $m_i$ is multiplied with a corresponding weighted number $w_i$, such as with a multiplier 802. The resulting vectors are then summed, such as with a summer 804. The summed vector is then used to update the tap coefficient vector for use by the feedforward filter of FIG. 7.

Tap coefficient processor unit 706 further includes a conventional tap coefficient generator. Tap coefficient generator generates a tap coefficient vector c, which includes vector components $c_1$ to $c_N$, as is known in the art. According to one embodiment, $c_1$ is set to 1, and $c_2$ to $c_N$ are set to zero. Tap coefficient processor unit 706 updates the current tap coefficient vector c by adding it to the summed vector from summer 804, i.e., the associated coefficients of each vector component are summed with an adder 806. This updated coefficient vector is then used by multipliers 704 (FIG. 7) to reduce the error and by multiplier circuit 712 (FIG. 7), where the updated vector is used both as a feedback and a feedforward signal. The iteration process continues until a desired error convergence is obtained.

In other embodiments of the adaptive equalizers described above, a hybrid scheme, which could combine the agility of the continuous-time LMS-based adaptation method and the optimality from BER perspective of the FEC-based adaptation method, is possible. One approach is that a subset of the tap coefficients (e.g., alternate taps) and possibly feedback taps is adapted using LMS-based adaptation. The remaining FFE and/or feedback taps may be adapted using FEC-based adaptation, as discussed above.

In addition to adapting the FFE and/or feedback taps, the threshold within the slicer may also be adapted based on FEC-based approach. In this case, the mask vector m will also have a component to represent an increment and/or decrement to the threshold in the slicer.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. An adaptive equalizer, comprising:
    an adaptive coefficient generator configured to receive an input signal and a control signal for generating tap coefficients;
    a feedforward filter coupled to the output of the adaptive coefficient generator and configured to receive the input signal;
    a slicer coupled to the output of the feedforward filter;
    a first summer coupled between the input of the slicer and the output of the feedforward filter;
    a multiplier coupled to a first input of the first summer;
    a first alignment circuit coupled to the input of the slicer;
    a second summer coupled to the output of the first alignment circuit and the output of the slicer for generating an error signal from the difference of the output of the slicer and first alignment circuit;
    a second alignment circuit coupled to the output of the slicer and which receives the error signal, the output of the second alignment circuit coupled to a first input of the multiplier; and
    a low pass filter configured to receive the error signal and the output of the second alignment circuit, the output of the low pass filter coupled to a second input of the multiplier.

2. The adaptive equalizer of claim 1, wherein the control signal is the error signal.

3. The adaptive equalizer of claim 1, wherein the control signal are the tap coefficients.

4. The adaptive equalizer of claim 1, wherein the feedforward filter comprises:
    N delays coupled in sequence, the first of the N delays configured to receive the input signal, each delay introducing a delay $\tau$;
    N+1 multipliers, wherein one multiplier is coupled to the input signal and each of N multipliers is coupled to an output of each of the N delays, respectively; and
    a summer coupled to the outputs of the N+1 multipliers.

5. The adaptive equalizer of claim 4, wherein the delay $\tau$ is less than one symbol period.

6. The adaptive equalizer of claim 5, wherein the delay $\tau$ is approximately one-half a symbol period.

7. The adaptive equalizer of claim 1, wherein the adaptive coefficient generator comprises a controllable delay that time-aligns the control signal with the input signal.

8. The adaptive equalizer of claim 7, wherein the control signal is the error signal.

9. The adaptive equalizer of claim 4, wherein the adaptive coefficient generator comprises:
    a controllable delay that time-aligns the control signal with the input signal;
    N delay circuits coupled in sequence, the first of the N delay circuits coupled to the output of the controllable delay, wherein each delay circuit introduces a delay $\tau'$;
    N multipliers, each configured to receive a corresponding output of each of the N delay circuits and a component of the control signal; and
    N low pass filters, each configured to receive a corresponding output of each of the N multipliers.

10. The adaptive equalizer of claim 9, wherein $\tau'$ is greater than $\tau$.

11. The adaptive equalizer of claim 7, wherein the controllable delay comprises:
    an interpolation control circuit configured to receive the control signal; and
    an interpolation delay circuit configured to receive an output of the interpolation control circuit and the input signal.

12. The adaptive equalizer of claim 11, wherein the interpolation control circuit comprises:
    N multipliers, each configured to receive a corresponding scaled signal and a component of the control signal;
    a summer configured to receive the outputs of the N multipliers;
    a low pass filter configured to receive the output of the summer; and
    a signal complement circuit configured to receive the output of the low pass filter.

13. The adaptive equalizer of claim 11, wherein the interpolation delay circuit comprises:
    three delay circuits coupled in sequence, the first of the delay circuits configured to receive the input signal;
    four multipliers configured to receive interpolation control signals, wherein the first multiplier is coupled to the input signal, and the remaining three multipliers are coupled to the outputs of corresponding delay circuits; and a summer configured to receive the output of the multipliers.

14. The adaptive equalizer of claim 9, wherein the low pass filters have a transfer function of $$H(s) = \frac{G}{1 + s \cdot T_l},$$

wherein G is the gain of the low pass filter and $T_l$ is the leakage time constant.

15. The adaptive equalizer of claim 14, wherein G is between 10 and 50.

16. The adaptive equalizer of claim 14, wherein $T_l$ is between approximately 10,000 and 100,000 symbol times.

17. The adaptive equalizer of claim 1, wherein the first alignment circuit time aligns the input to the slicer with the output of the slicer using a control signal.

18. The adaptive equalizer of claim 17, wherein the control signal is the error signal.

19. The adaptive equalizer of claim 1, wherein the second alignment circuit time aligns the output of the slicer to a symbol period delay using a control signal.

20. The adaptive equalizer of claim 19, wherein the control signal is the error signal.

21. An adaptive equalizer, comprising:
a feedforward filter configured to receive an input signal and tap coefficients;
a slicer coupled to the output of the feedforward filter;
a summer coupled between the feedforward filter and the slicer;
a multiplier coupled to an input of the summer;
an alignment circuit coupled between the slicer and the multiplier and configured to receive the output from the slicer;
a clock and data recovery (CDR) circuit configured to receive the input and output signals from the slicer;
a forward error correction (FEC) circuit configured to receive an output signal from the CDR circuit;
a statistics generator configured to receive the input and output signals from the FEC circuit; and
an adaptive tap coefficient generator coupled to receive the output from the statistics generator, wherein the output of the adaptive tap coefficient generator is coupled to the feedforward filter.

22. The adaptive equalizer of claim 21, wherein the statistics generator compiles bit error patterns between the input of the FEC circuit and the output of the FEC circuit.

23. The adaptive equalizer of claim 22, wherein the adaptive tap coefficient generator generates tap coefficients based on the number of occurrences of the bit error patterns.

24. A method for adapting an equalizer, comprising;
(a) determining the number of error patterns for each bit pattern of an input signal, wherein the determining comprises comparing the input of a forward error correction circuit to the output of the forward error correction circuit;
(b) selecting a mask vector for each of the different error patterns; and
(c) updating a tap coefficient vector based on the error patterns.

25. The method of claim 24, further comprising repeating (a), (b), and (c).

26. The method of claim 24, wherein the selecting comprises decrementing the tap coefficients corresponding to the one or two bits on either side of the bit in error for each error pattern.

27. The method of claim 24, wherein after the determining, generating a normalized weight for each of the error patterns, wherein the higher the weight, the higher number of occurrences for the corresponding error pattern.

28. The method of claim 26, wherein the selecting further comprises leaving unchanged or incrementing the remaining tap coefficients corresponding to the bit pattern for each error pattern.

29. The method of claim 24, wherein the updating comprises:
decrementing the tap coefficients corresponding to the one or two bits on either side of the bit in error for each error pattern to generate the mask vectors;
generating a normalized weight for each of the error patterns;
multiplying each normalized weight with a corresponding one of the mask vectors to generate a plurality of product terms;
summing the product terms; and
adding the tap coefficient vector to the summed product terms.

* * * * *